United States Patent [19]

Yoshida et al.

[11] Patent Number: 4,764,972

[45] Date of Patent: Aug. 16, 1988

[54] CONTINUOUS CHARACTERS RECOGNITION SYSTEM

[75] Inventors: Kazunaga Yoshida; Hiroshi Shimizu; Masao Watari, all of Tokyo, Japan

[73] Assignee: NEC Corporation, Tokyo, Japan

[21] Appl. No.: 866,524

[22] Filed: May 23, 1986

[30] Foreign Application Priority Data

| May 23, 1985 | [JP] | Japan | 60-110743 |
| Aug. 6, 1985 | [JP] | Japan | 60-173421 |
| Feb. 27, 1986 | [JP] | Japan | 61-42148 |
| Mar. 11, 1986 | [JP] | Japan | 61-53397 |

[51] Int. Cl.$^4$ .............................................. G06K 9/00
[52] U.S. Cl. ........................................... 382/13; 382/3
[58] Field of Search ................................. 382/9, 3, 13

[56] References Cited

U.S. PATENT DOCUMENTS 4,024,500  5/1977  Herbst et al. ................... 382/13
4,654,873  3/1987  Fujisawa et al. ................ 382/9

*Primary Examiner*—Theodore M. Blum
*Attorney, Agent, or Firm*—Sughrue, Mion, Zinn, Macpeak & Seas

[57] ABSTRACT

A recognition system for recognizing a plurality of continuous hand-written characters, employing a first memory in which isolated characters are stored, and a second memory which stores information, including interstroke character information, for connecting isolated characters. According to various embodiments of the invention, this interstroke information may be stored as part of a continuous character, or by itself.

7 Claims, 7 Drawing Sheets

| S\E | T | M | B |
|---|---|---|---|
| T | U (CTT) | A (CTM) | B (CTB) |
| M | ⌒ (CMT) | ∮ (CMM) | e (CMB) |
| B | N (CBT) | ℓ (CBM) | α (CBB) |

FIG. 23

| S\E | T | M | B |
|---|---|---|---|
| T | (STT) | (STM) | (STB) |
| M | (SMT) | (SMM) | (SMB) |
| B | (SBT) | (SBM) | (SBB) |

CONTINUOUS CHARACTERS RECOGNITION SYSTEM

BACKGROUND OF THE INVENTION

The present invention relates to a recognition system for which recognizes a plurality of continuous hand-written characters.

A conventional character recognition system recognizes each one character in each recognizing operation cycle. Before the recognizing operation, the system segments a plurality of hand-written continuous characters (i.e., input script writing) into individual characters. The following methods have been proposed for such character segmentation.

In an "end-key" method, an end-key is depressed every time each character has been written, and the script writing up to the depression of the end-key is segmented as a single character. In a "time-out" method, a certain period of time (a pause) is inserted from one script character to the next script character, and the first script character is segmented as a single character. In a "character-rim" method, each character is written within a characterrim and script writing in each character-rim is segmented as a single character.

Thus, the conventional system has required a user to conduct some operation such as depressing an end key, providing a pause, or writing words within the rims in order to segment the characters. As a result, it has not been possible to recognize a plurality of continuously written characters having no break between consecutive characters.

SUMMARY OF THE INVENTION

Therefore, an object of the present invention is to provide a continuous characters recognition system which requires no segmentation operation to recognize the continuously written characters.

Another object of the present invention is to provide a continuous characters recognition system capable of recognizing a plurality of characters which are written without a break therebetween.

A continuous characters recognition system according to the present invention comprises: an input unit for transforming script writing of characters to an input pattern; an isolated character patterns memory for storing a plurality of isolated character patterns each representing a pattern from a start point to an end point of each reference character; a continuous character patterns memory for storing a plurality of continuous character patterns each representing a pattern from a start point of each reference character to a start point of the succeeding reference character to follow; and a recognition unit for recognizing the input pattern by comparing the input pattern with a combination of at least one of the continuous character patterns stored in the continuous character patterns memory and one of the isolated character patterns stored in the isolated character patterns memory, one of the isolated character patterns being connected after the continuous character pattern.

BRIEF DESCRIPTION OF THE DRAWINGS

FIG. 15 is a block diagram of the second embodiment of the present invention;

FIGS. 16$a$–16$i$ and 17$a$–17$c$ show the contents of character memories shown in FIG. 15;

DETAILED DESCRIPTION OF THE PREFERRED EMBODIMENTS

The principles of the first embodiment of the present invention will now be described by referring to the case of recognizing numerals.

Figure 1:
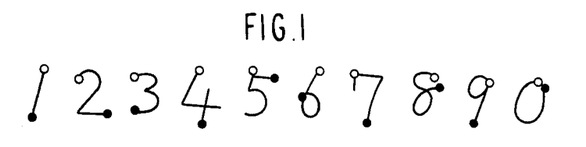
FIG. 1 illustrates hand-writing numeral patterns for explaining the principle of a first embodiment of the present invention.

FIG. 1 illustrates examples of hand-writing numeral patterns from "1" to "0", in which the start point of writing of each numeral is indicated by a white circle, and the end point thereof is indicated by a black point. As shown in the figure, the positions of the end points of the numerals vary depending on individual numerals, while those of the start points thereof are located in substantially constant position, i.e., in an upper position. It can be, therefore, said that the script from the ending point of one numeral to the starting point of the succeeding numeral (intercharacter stroke) is substantially constant irrespective of the succeeding numeral.

Figure 2:
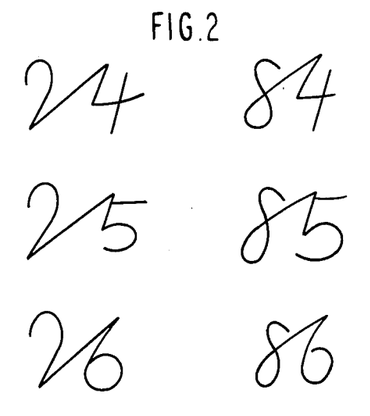
FIGS. 2 to 4 illustrate continuously written numeral patterns for describing a first embodiment of the present invention.

FIG. 2 illustrates examples of two numerals which are continuously written without a break therebetween. As described above, the preceeding numeral includes the intercharacter stroke due to continuous writing, but the script from the start point of the preceding numeral to that of the succeeding numeral is substantially constant depending on the succeeding numeral. Further, the shape of the succeeding character does not change whether it is written without a break from the preceding character or it is written by itself. In summary, it can be said that the numerals continuously written with or without a break therebetween have a constant shape, irrespective of the preceding and succeeding numerals. Also, the shape of the last numeral of a sequence of continuously written numerals is similar to that of that last numeral written alone.

In view of the above, the first embodiment utilizes a reference pattern which includes a continuous character pattern and an isolated character pattern. The continuous character pattern is defined by the character pattern including the intercharacter stroke, that is, starting from the start point of the character and ending at the start point of the succeeding character continuously written. The isolated character pattern is defined by the character pattern representing discrete characters, that is, starting from the point of the same character. The reference pattern is produced by connecting zero or more continuous character patterns successively, and then connecting a single isolated character pattern thereafter.

Figure 3:
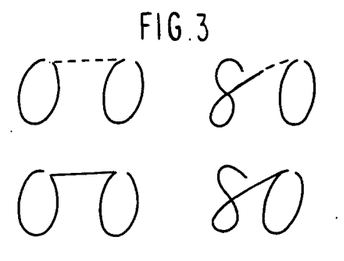

As shown in FIG. 3, many numerals may be less changed in their main shape depending on whether or not they are continuously written. Accordingly, the preceding numeral can be recognized by comparing it with the continuous character pattern when it is written with an intercharacter stroke, and by comparing it with the isolate character pattern when it is written with a break between it and the succeeding numeral.

Figure 4:
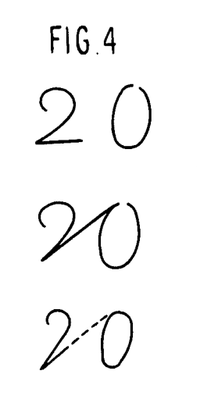

In contrast, as shown in FIG. 4, the numeral "2" is changed in its shape depending on whether or not it is continuously wirtten. Accordingly, two kinds of continuous character patterns for "2" may be required to handle the different cases in which it is written with and without the intercharacter stroke.

One example of a systems for recognizing script characters is described in the IBM Technical Disclosure Bulletin Vol. 24, No. 11A, April, 1982, pages 5405–5409, entitled "CURSIVE SCRIPT RECOGNITION SYSTEM BY ELASTIC MATCHING" by C. C. Tappert (hereinafter referred to as Reference (1)). According to this system, input script writing is converted to a time series pattern $A=(a_i; 1 \leq i \leq I)$ representing azimuths of the segments which constitute the script writing, where $a_i$ denotes an azimuth and I denotes the number of segments. This time series pattern A is assumed as an input pattern. A reference pattern $B_k=(b_j; 1 \leq j \leq J_k)$ previously has been stored in the recognition unit in the form of a time series pattern of azimuths similar to the input patterns, where k ($1 \leq k \leq K$) denotes a reference pattern category, $b_j$ denotes an azimuth, and $J_K$ denotes the number of segments of the reference pattern of the category k.

The distance $d(i, j)$ between the i-th data of the input pattern A and the j-th data of the reference pattern $B_K$ is defined by an angle between the azimuths $a_i$ and $b_j$. An interpattern distance $D_K$ between the input pattern A and the reference pattern $B_K$ is defined by a cumulative value of the distance $d(i, j)$ along with the corresponding time. This matching of distance with time can be effected by the use of the DP (dynamic Programming) matching method described in Reference (1). The category which minimizes the interpattern distance $D_K$ thus obtained is taken as the result of the recognition procedure.

In accordance with the first embodiment, the reference pattern $B_K$ for use in recognition is produced by conecting zero or more continuous character patterns BC to a single isolated character pattern BI thereafter. In recognition, the reference patterns $B_K$ thus produced are prepared in number as required, and then subjected to pattern matching with the input pattern A.

The above-described method includes the steps of connecting a plurality of reference patterns in a predetermined sequence and effectively recognizing an input pattern represented in the form of a time series from comparison therewith. Meanwhile, the method can be achieved by using the same method adopted in the continuous speech recognition system described in U.S. Pat. Nos. 4,326,101 and 4,555,796 (hereinafter referred to as References (2) and (3)). Since the input pattern used in speech recognition is also a time series pattern, a similar method is adaptable to character pattern recognition. References (2) and (3) disclose the principles and the system constitution controlled by a finite-state automaton so that the input pattern of speech continuously spoken can be recognized in accordance with predetermined grammar rules.

In the first embodiment, a particular finite-state automaton is employed to control the connection between the continuous character patterns and the isolated character pattern with respect to continuously written characters in place of continuous speech.

Figure 5:
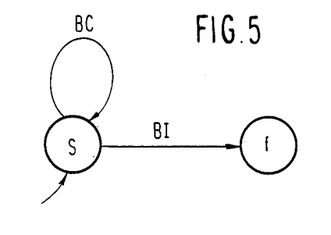
FIGS. 5 and 6 show the finite-state automation applied to the first embodiment of the present invention.

FIG. 5 shows an example of a finite-state automaton which is applicable to the first embodiment. This finite-state automaton takes two states; an initial state s and a final state f. Upon receipt of the continuous character pattern BC, the automaton is transited from the initial state s to the same initial state s. Upon receipt of the isolated character pattern BI, it is transited from the initial state s to the final state f so as to complete the process.

The finite-state automaton described above enables production of a reference pattern including zero or more pieces of the continuous character patterns connected to each other and the single isolated character pattern following thereafter. Accordingly, the input pattern of continuously written characters can be recognized in accordance with the reference pattern.

Figure 6:
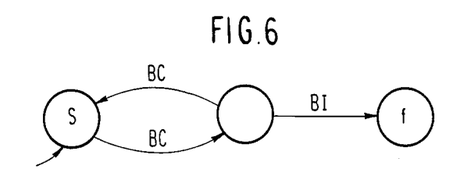

Other various types of automations are also usable in the first embodiment. For instance, use of a finite-state automaton as shown in FIG. 6 makes it possible to recognize only even numbers of continuous characters.

Figures 7, 8:
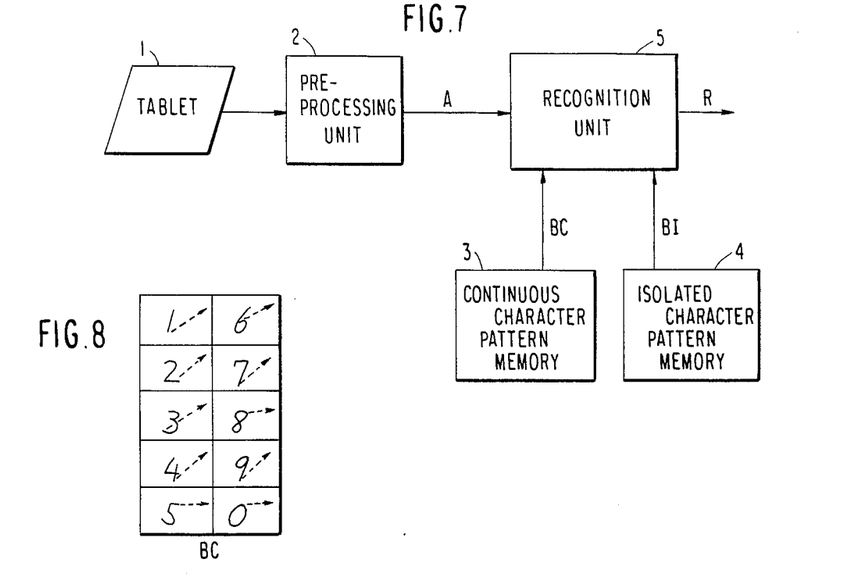
FIG. 7 is a block diagram of the first embodiment of the present invention.
FIGS. 8 and 9 show the contents of character memories shown in FIG. 7.

FIG. 7 is a block diagram of a first embodiment of the present invention.

Figure 9:
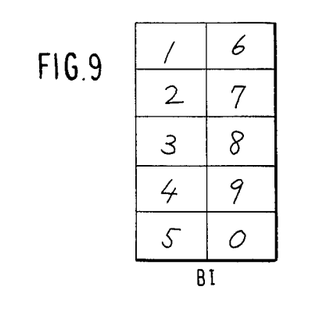

A character pattern input through a table 1 is converted by a pre-processing unit 2 to an input pattern A in the form of a time series pattern of azimuths as disclosed in Reference (1). The continuous character patterns BC shown in FIG. 8 are stored in a continuous character pattern memory 3, and the isolated character patterns BI shown in FIG. 9 are stored in an isolated character pattern memory 4. A recognition unit 5 produces the reference pattern by accessing the memories 3 and 4 in response to the input pattern A by using the finitestate automaton shown in FIG. 5 in the manner described in References (2) and (3). Thus, the recognition unit 5 determines the recognition result R as a character sequence.

Figure 10:
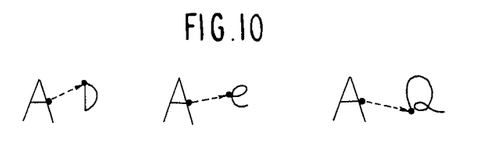
FIG. 10 illustrates continuously written alphabet patterns for describing a second embodiment of the present invention.

In the above embodiment, only one type of intercharacter stroke for each of the continuous character patterns is prepared depending on the succeeding characters. In the case of alphabets, however, the shape of an intercharacter stroke is changed depending on the succeeding character, as illustrated in FIG. 10. Accordingly, the first embodiment cannot recognize alphabets which are continuously written.

According to a second embodiment of the present invention, a plurality of continuous character patterns for each character are prepared in correspondence with to the start point positions of the succeeding characters.

Figure 11:
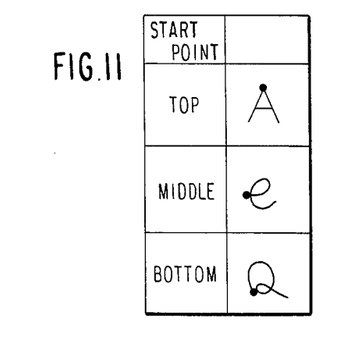
FIG. 11 illustrates three sets of isolated character patterns used in the second embodiment.

The start point positions of alphabets an be grouped into three types, i.e., "top", "middle" and "bottom", and the isolated character patterns can be grouped into three sets according to the start point positions as shown in FIG. 11:

"TF" . . . having a "top" start point;
"MF" . . . having a "middle" start point; and
"BF" . . . having a "bottom" start point.

Figure 12:
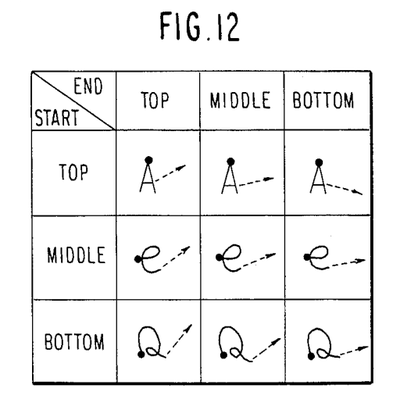
FIG. 12 illustrates nine sets of continuous character pattern used in the second embodimet.

In addition, the continuous character patterns can be grouped into nine sets according to the start point and the end point (i.e., the start point of the succeeding character) as shown in FIG. 12:

"TT" . . . having a "top" start point and a "top" end point;
"TM" . . . having a "top" start point and a "middle" end point;
"TB" . . . having a "top" start point and a "bottom" end point;
"MT" . . . having a "middle" start point and a "top" end point;
"MM" . . . having a "middle" start point and a "middle" end point;
"MB" . . . having a "middle" start point and a "bottom" end point;
"BT" . . . having a "bottom" start point and a "top" end point;
"BM" . . . having a "bottom" start point and a "middle" end point; and
"BB" . . . having a "bottom" start point and a "bttom" end point.

A reference pattern for continuous characters is produced by connecting zero or more pieces of the continuous character pattern(s) successively; and then connecting one of the isolated character patterns at the end thereof. Herein, the continuous character pattern(s) and the isolated character pattern are connected such that the position of the end point of the preceeding character pattern corresponds to that of the start point of the succeeding character pattern. The finite-state automaton can also be used in such controls for connecting the character pattern and recognizing the input pattern.

Figure 13:
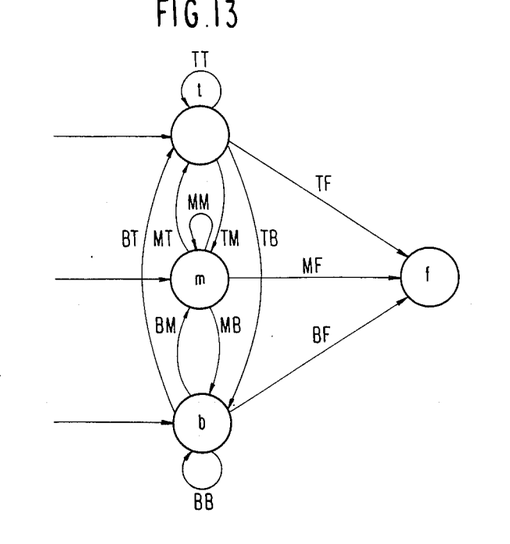
FIGS. 13 and 14 show the finite-state automation applied to the second embodiment of the present invention.

FIG. 13 shows an example of a modified control by the finite-state automaton. This finite-state automaton has three initial states t, m, b and one final state f. For instance, by receiving the continuous character pattern TT in the state t, the automaton transmits from the state t to the same state t, by receiving the continuous character pattern TM, it transmits from the state t to the state m; and by receiving the continuous character pattern TB, it transmits from the state t to the state b. In this manner, transitions among three states t, m and b are repeated depending on receiving the individual continuous character patterns. Then, by receiving any one of the isolated character patterns TF, MF and BF, it transmits to the final state f and completes the process.

As described above, continuous characters in the combined form of various types of characters can be recognized based on the reference pattern including the continuous character patterns and the isolated character pattern with their corresponding start points and end points connected to each other without contradiction.

Figure 14:
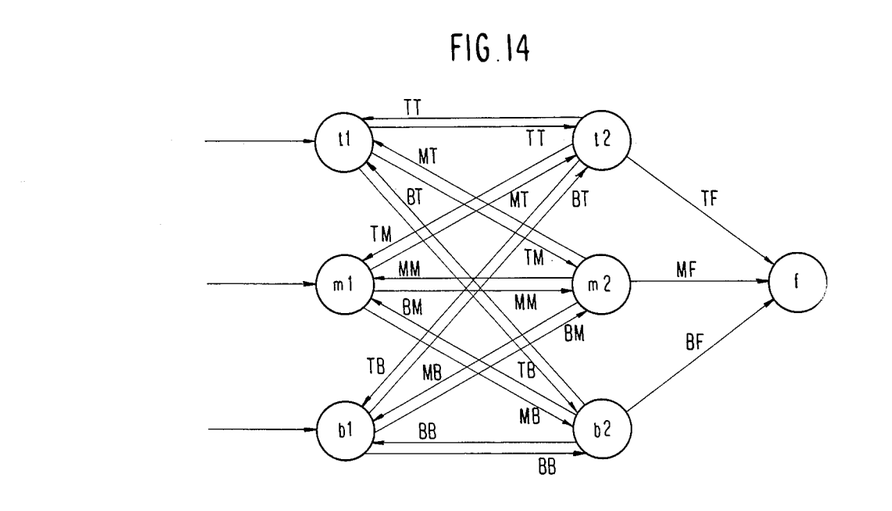

Other various types of automata are also usable in the second embodiment. For instance, use of a finite-state automaton as shown in FIG. 14 makes it possible to recognize only even numbers of continuous characters.

Figures 15, 17A, 17B:
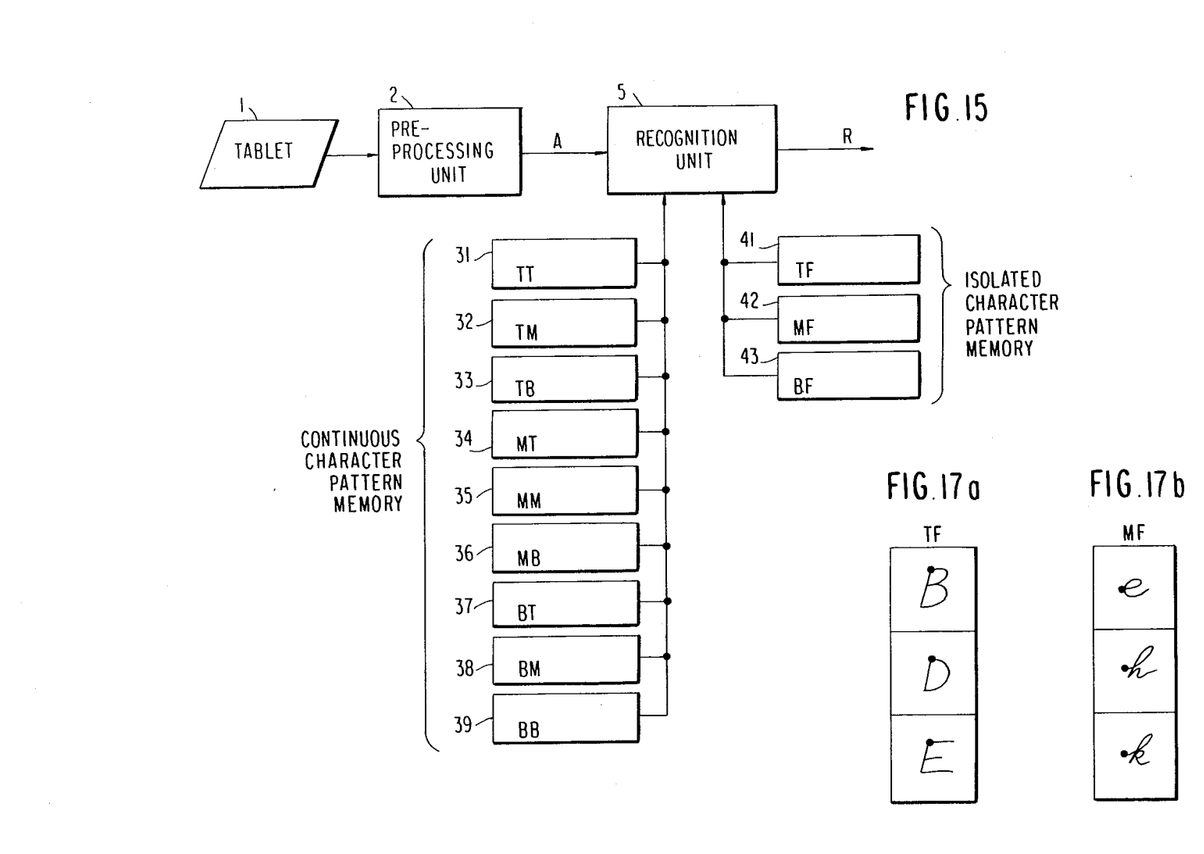
Figure 16A:
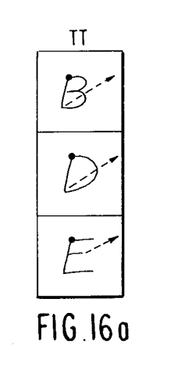
Figure 16B:
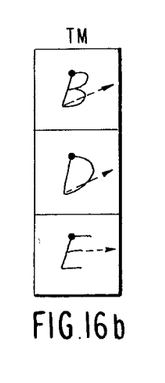
Figure 16C:
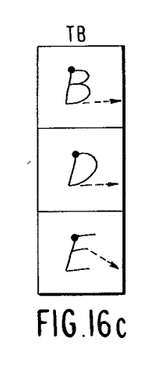
Figure 16D:
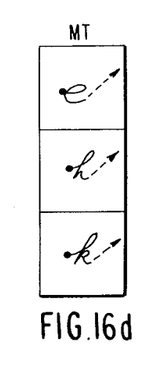
Figure 16E:
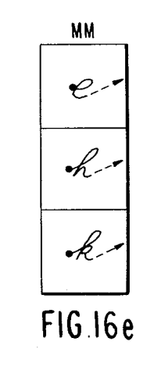
Figure 16F:
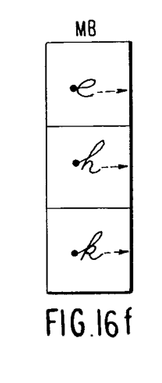
Figure 16G:
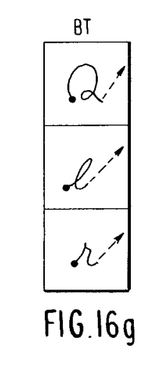
Figure 16H:
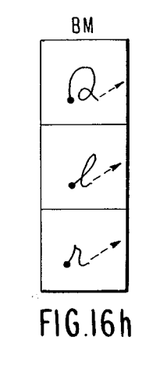
Figure 16I:
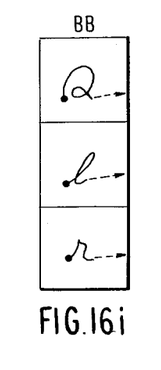

FIG. 15 is a block diagram of the second embodiment.

Figure 17C:
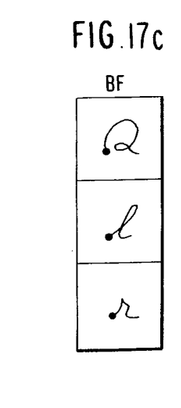

A character pattern input through a tablet 1 is converted by a pre-processing unit 2 to an input pattern A in the form of a time series pattern of azimuths in the same manner as in the first embodiment. The nine sets of continuous character patterns TT, TM, TB, MT, MM, MB, BT, BM and BB, shown in FIGS. 16(a)–16(i), are stored in continuous character pattrn memories 31–39, respectively. The three sets of the isolated character patterns TF, MF and BF, shown in FIGS. 17(a)–17(c), are stored in isolated character pattern memories 41–43, respectively. In a recognition unit 5, the input pattern A is recognized by using the finite-state automaton shown in FIG. 13 by means of the contents of the memories 31–39 and 41–43, i.e., the continuous character patterns and the isolated character patterns. The recognition result R is in the form of a character sequence. The recognition unit 5 carries out the recognition operation under control of the finite-state automaton described in References (2) and (3).

In the above embodiments, both the continuous character pattern and the isolated character pattern are prepared for each character, with the result that memory capacity is increased. Further, in the process of determining the interpattern distance $D_K$, the arithmetic operation for the input pattern is required seperately for the isolated character pattern and the continuous character patterns. Therefore, a larger amount of computation is required.

According to a third embodiment, the continuous character pattern is divided into an isolated character pattern and an intercharacter stroke pattern, and only the intercharacter stroke pattern is stored.

Figure 18:
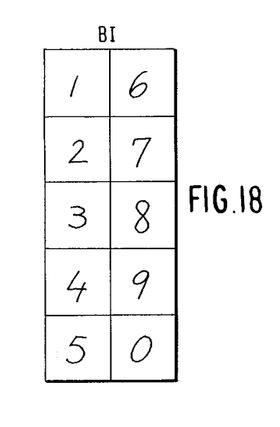
FIGS. 18 and 19 illustrate isolated character patterns and intercharacter stroke patterns used in a third embodiment of the present invention.
Figure 19:
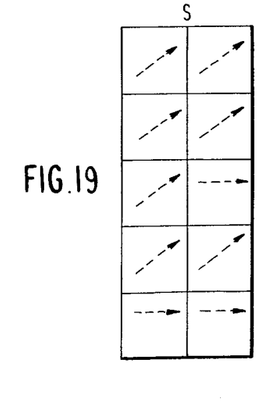

Referring to FIGS. 18 and 19, the isolated character patterns BI of the numerals are stored, in a manner similar of that of the first embodiment. Instead of the continuous character patterns BC, the intercharacter stroke patterns S are prepared in correspondence with each of the isolated patterns BI. The shapes of the intercharacter patterns S for numerals "5", "8" and "0" are the same, i.e., they have a "top" start point and a "top" end point. The other intercharacter patterns S also have the same shape, i.e., a "bottom" start point and a "top" end point.

The continuous character pattern of the first embodiment can be produced by connecting the isolated character pattern BI and the intercharacter stroke pattern S. The intercharacter stroke pattern S does not require much memory capacity. Therefore, the total memory capacity can be reduced by about half in comparison with the first embodiment.

A reference pattern of the third embodiment is produced by connecting the intercharacter stroke pattern S and the isolated character pattern in accordance with the modified finite-state automaton.

Figures 20, 24:
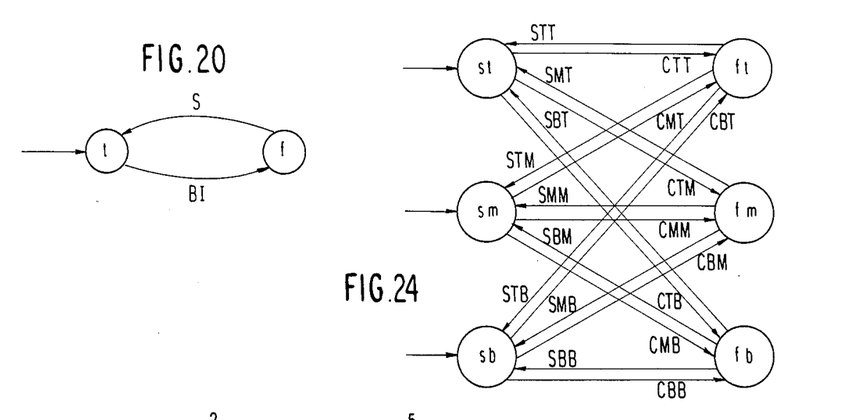
FIG. 20 show the finite-state automation applied to the third embodiment of the present invention.
FIGS. 24 and 25 show the finite-state automation applied to the fourth embodiment.

FIG. 20 shows an example of the modified control by the finite-state automaton. This finite-state automaton has an initial state t and a final state f. Upon receipt the isolated character pattern BI in the initial state t, the automaton transmits to final state f. Upon receipt the intercharacter strok pattern S in the final state f, it returns to the initial state t. Matching with a plurality of characters can be made by repeating the above process. Then, the process is completed in the final state f.

Since the isolated character pattern is commonly used in matching the isolated character and the continuous character, and since matching with the intercharacter stroke requires a very small amount of computation, the total amount of computation is reduced by about half in comparison with the first embodiment.

Figure 21:
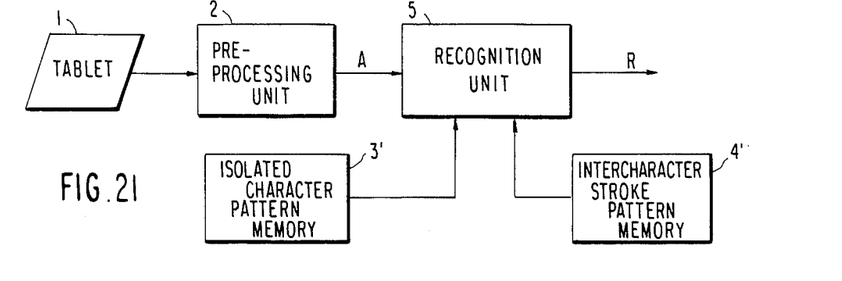
FIG. 21 is a block diagram of the third embodiment of the present invention.

FIG. 21 is a block diagram of the third embodiment of the present invention.

A character pattern input through a tablet 1 is converted by a pre-processing section 2 to an input pattern A in the form of a time series pattern of azimuths, in the same manner as in the foregoing embodiments. The isolated character patterns BI are stored in an isolated character pattern memory 31, and the above-mentioned intercharacter stroke patterns in the memories 31 and 41.

In the third embodiment, only one intercharacter stroke pattern is allotted for one isolated character pattern. When recognizing alphabets, however, the shape of the intercharacter stroke is changed depending on the position of the end point of the preceding character and the start point of the succeeding character.

Figure 22:
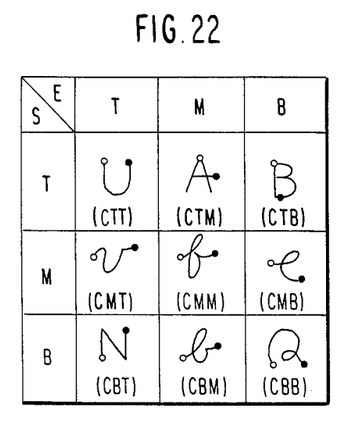
FIGS. 22 and 23 illustrate isolated character patterns and intercharacter stroke patterns, respectively, used in a fourth embodiment of the present invention.
Figure 23:
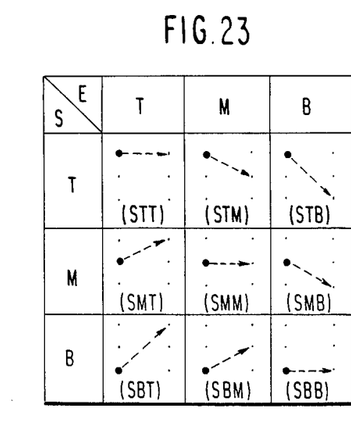

For this reason, the isolated character patterns and the intercharacter stroke patterns are required to be grouped into nine sets, respectively, as shown in FIGS. 22 and 23. That is, a set of isolated character patterns is as follows:

"CTT" . . . having a "top" start point and a "top" end point;
"CTM" . . . having a "top" start point and a "middle" end point;
"CTB" . . . having a "top" start point and a "bottom" end point;
"CMT" . . . having a "middle" start point and a "top" end point;
"CMM" . . . having a "middle" start point and a "middle" end point;
"CMB" . . . having a "middle" start point and a "bottom" end point;
"CBT" . . . having a "bottom" start point and a "top" end point
"CBM" . . . having a "bottom" start point and a "middle" end point; and
"CBB" . . . having a "bottom" start point and a "bottom" end point.

Similarly, a set of intercharacter stroke patterns is as follows:

"STT" . . . having a "top" start point and a "top" end point;
"STM" . . . having a "top" start point and a "middle" end point;
"STB" . . . having a "top" start point and a "bottom" end point;
"SMT" . . . having a "middle" start point and a "top" end point;
"SMM" . . . having a "middle" start point and a "middle" end point;
"SMB" . . . having a "middle" start point and a "bottom" end point;
"SBT" . . . having a "bottom" start point and a "top" end point;
"SBM" . . . having a "bottom" start point and a "middle" end point; and
"SBB" . . . having a "bottom" start point and a "bottom" end point.

In a fourth embodiment of the present invention, only the isolated character patterns of all the reference characters and nine intercharacter stroke patterns STT to SBB are required to perform the continuous character recognition. Since the intercharacter stroke patterns require little memory capacity to store, the total amount of memory capacity to store the reference character pattern can be reduced to about a quarter in comparison with the second embodiment.

A reference pattern for continuous characters is produced by connecting the intercharacter stroke pattern to the preceding isolated character pattern in a repeated manner, and further connecting one of the isolated character pattern at the end thereof. Herein, the isolated character pattern and the intercharacter stroke pattern are connected such that the position of the end point of the preceding isolated character pattern corresponds to that of the start point of the intercharacter stroke pattern, and that the position of the end point of the intercharacter pattern corresponds to that of the start point of the succeeding isolated character pattern. This control is performed in accordance with the finite-state automaton described below.

FIG. 24 shows an example of the control by the finite-state automaton of the fourth embodiment. This finite-state automaton has three initial states st, sm, sb and three final states ft, fm, fb. The finite-state automaton is operated as follows by way of example. Receipt of the isolated character pattern CTM causes a transition from the state st to the state sb. In this manner, transitions are alternately repeated between the states st, sm, sb and the states ft, fm, fb depending on the receipt of the isolated character patterns and the intercharacter stroke patterns. Finally, the process is completed after a transition to any one of the states ft, fm and fb.

As described above, continuous characters can be recognized with reduced memory capacity and reduced computational requirements by using the reference patterns comprising the isolated character patterns and the intercharacter stroke patterns.

While the start point and the end point are grouped into three types in the fourth embodiment, they may be grouped into any desired number of types. While the description was made for alphabets as an example of characters, the invention is also to other general characters in the same manner. Further, while the basic character recognition method was explained in connection with the case of using azimuth data, other various methods can also be adopted. Moreover, other various types of finite-state automata are also usable in the control for connection of the isolated character patterns and the intercharacter patterns. For instance, it is possible to recognize only even or odd numbers of continuous characters.

Figure 25:
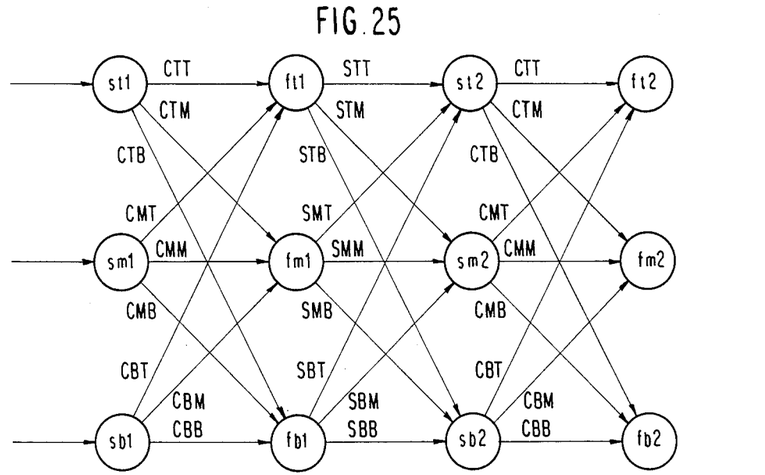

FIG. 25 shows an example of a finite-state automaton which is adapted to recognize only two characters successively connected.

Figure 26:
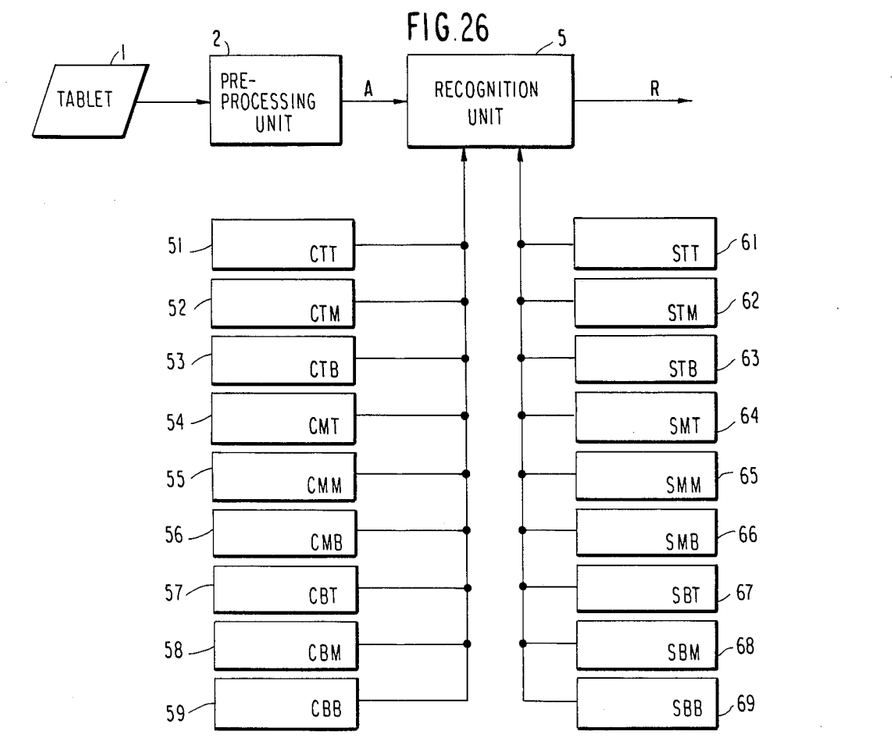
FIG. 26 is a block diagram of the fourth embodiment.

FIG. 26 is a block diagram of a fourth embodiment of the present invention.

A character pattern input through a tablet 1 is converted by a pre-processing section 2 to an input pattern A in the form of a time series pattern of azimuths in the same manner as in the foregoing embodiments. The isolated character patterns CTT, CTM, CTB, CMT, CMM, CMB, CBT, CBM and CBB are stored in isolated character pattern memories 51-59, respectively. The intercharacter stroke patterns STT, STM, STB, SMT, SMM, SMB, SBT, SBM and SBB are stored in intercharacter stroke pattern memories 61-69, respectively. A recognition unit 5 recognizes the input pattern A to output a recognition result R in accordance with the finite-state automaton shown in FIG. 24 by using the isolated character patterns and the intercharacter stroke patterns. The detail of the recognition unit 5 is described in References (2) and (3).

In accordance with the present invention, there can be obtained a continuous character recognition system which is operable without segmenting the continuous characters.

What is claimed is:

1. A continuous characters recognition system comprising:

an input unit for transforming script writing of characters to produce an input pattern without segmenting said script writing;

an isolated character patterns memory for storing a plurality of isolated character patterns, each of said plurality of isolated character patterns representing a pattern from a start point to an end point of a corresponding one of a plurality of reference characters;

a continuous character patterns memory for storing a plurality of continuous character patterns, each of said plurality of continuous character patterns representing a pattern from a start point of each said reference character to a start point of a succeeding one of said reference characters; and a recognition unit for recognizing said input pattern by producing a reference pattern based on a finite-state automaton and by comparing said input pattern with said reference pattern, said reference pattern including a combination of at least one of said continuous character patterns and one of said isolated character patterns, said one of said isolated character patterns being connected after said at least one of said continuous character patterns, said finite-state automaton providing an instruction path for combining ones of said continuous character patterns and said isolated character patterns to produce said reference pattern, comparison of said input pattern with said reference pattern being carried out without segmenting said input pattern.

2. The continuous characters recognition system as claimed in claim 1, wherein each of said continuous character patterns comprises each of said isolated character patterns and at least one intercharacter stroke pattern representing a pattern from an end point of each said reference character to a start point of each said succeeding reference character to follow said each said reference character.

3. The continuous characters recognition system as claimed in claim 2, wherein each of said continuous character patterns comprises each of said isolated character patterns and a plurality of intercharacter stroke patterns for each of said reference characters in accordance with the start point positions of each said succeeding reference character.

4. A continuous characters recognition system comprising:

an input unit for detecting script writing of characters and transforming said script writing to an input pattern without segmenting said script writing;

a first memory for storing a plurality of isolated character patterns, each of said isolated character patterns representing a pattern from a start point to an end point of each of a plurality of reference characters;

a second memory for storing a plurality of intercharacter stroke patterns, each of said intercharacter stroke patterns representing a pattern from an end point of each said reference character to a start point of a succeeding one of said reference characters; and a recognition unit for recognizing said input pattern by producing a reference pattern based on a finite-state automaton and by comparing said input pattern with said reference patern, said reference pattern including a combination of at least two isolated character patterns read out of said first memory and at least one of said intercharacter stroke patterns read out of said second memory, each of said intercharacter stroke patterns being inserted between two of said isolated character patterns in said combination, said finite-state automaton providing an instruction path for combining ones of said continuous character patterns and said isolated character patterns to produce said reference pattern, comparison of said input pattern with said reference pattern being carried out without segmenting of said input pattern.

5. The continuous characters recognition system as claimed in claim 4, wherein said second memory has stored therein a plurality of said intercharacter stroke patterns for different end points of said each reference character and different state points of each said succeeding one of said reference characters.

6. A continuous characters recognition system as claimed in claim 1, wherein said input unit produces said input pattern as a time series of azimuths.

7. A continuous characters recognition system as claimed in claim 4, wherein said input unit produces said input pattern as a time series of azimuths.

* * * * *

UNITED STATES PATENT AND TRADEMARK OFFICE
CERTIFICATE OF CORRECTION

PATENT NO. : 4,764,972
DATED : August 16, 1988
INVENTOR(S) : Yoshida et al

It is certified that error appears in the above-identified patent and that said Letters Patent is hereby corrected as shown below:

COLUMN 1, LINE 8    Delete "for"

COLUMN 2, LINE 16   Delete "embodimet" insert --embodiment--

COLUMN 5, LINE 2    Delete "to"

COLUMN 5, LINE 3    Delete "an" insert --can--

COLUMN 5, LINE 31   Delete "bttom" insert --bottom--

COLUMN 6, LINE 63   Delete "strok" insert --stroke--;

COLUMN 7, LINE 11   After "memory" delete the rest of the paragraph and insert --3', and the above-mentioned intercharacter stroke patterns S are stored in intercharacter stroke pattern memory 4'. A recognition unit 5 recognizes the input pattern A to output a result R in accordance with the finite-state automation shown in Fig. 20 by using the isolated character patterns and the intercharacter stroke patterns in the memories 31 and 41.--

Signed and Sealed this

Twenty-first Day of February, 1989

Attest:

DONALD J. QUIGG

Attesting Officer    Commissioner of Patents and Trademarks